(12) United States Patent
Harada

(10) Patent No.: US 11,135,724 B2
(45) Date of Patent: Oct. 5, 2021

(54) ROBOT SYSTEM, CALIBRATION JIG FOR ROBOT, AND CALIBRATION METHOD FOR ROBOT

(71) Applicant: Seiko Epson Corporation, Tokyo (JP)

(72) Inventor: Atsushi Harada, Matsumoto (JP)

(73) Assignee: Seiko Epson Corporation

( * ) Notice: Subject to any disclaimer, the term of this patent is extended or adjusted under 35 U.S.C. 154(b) by 164 days.

(21) Appl. No.: 16/658,715

(22) Filed: Oct. 21, 2019

(65) Prior Publication Data

US 2020/0122332 A1 Apr. 23, 2020

(30) Foreign Application Priority Data

Oct. 22, 2018 (JP) .............................. JP2018-198377

(51) Int. Cl.
*B25J 9/16* (2006.01)
*B25J 19/02* (2006.01)

(52) U.S. Cl.
CPC ........... *B25J 9/1692* (2013.01); *B25J 9/1635* (2013.01); *B25J 9/1697* (2013.01); *B25J 19/023* (2013.01)

(58) Field of Classification Search
USPC .................................................. 700/245–264
See application file for complete search history.

(56) References Cited

U.S. PATENT DOCUMENTS

| 4,498,778 | A | * | 2/1985 | White | G01B 11/25 |
| | | | | | 348/94 |
| 5,400,638 | A | * | 3/1995 | Kim | B25J 9/1692 |
| | | | | | 73/1.79 |
| 5,471,312 | A | * | 11/1995 | Watanabe | B25J 9/1692 |
| | | | | | 347/256 |
| 6,067,165 | A | * | 5/2000 | Matsumiya | G01B 11/005 |
| | | | | | 356/399 |
| 6,114,824 | A | * | 9/2000 | Watanabe | B25J 9/1697 |
| | | | | | 29/407.04 |
| 6,246,789 | B1 | * | 6/2001 | Hosotani | H05K 13/0818 |
| | | | | | 382/151 |

(Continued)

FOREIGN PATENT DOCUMENTS

JP H06-243236 A 9/1994
JP 2015-106287 A 6/2015

*Primary Examiner* — Jonathan L Sample
(74) *Attorney, Agent, or Firm* — Harness, Dickey & Pierce, P.L.C.

(57) ABSTRACT

A jig according to the present disclosure includes N planes (N is an integer equal to or larger than 4) respectively attached with patterns, in which $$-90° < \theta < 90° \quad (1)$$

$$\theta \neq 0 \quad (2)$$

where $\theta$ is an angle formed by, with respect to a reference normal vector perpendicular to a jig reference plane, the jig reference plane being one plane among the N planes, and having a direction from the jig reference plane toward a space in which the stereo camera is disposed, a non-reference normal vector perpendicular to a non-reference plane different from the jig reference plane among the N planes and having a direction from the non-reference plane toward the space in which the stereo camera is disposed. Non-reference normal vectors corresponding to N−1 non-reference planes among the N planes have directions different from one another with respect to the reference normal vector and do not have directions symmetrical with respect to the reference normal vector.

8 Claims, 9 Drawing Sheets

(56) References Cited

U.S. PATENT DOCUMENTS

| | | | | |
|---|---|---|---|---|
| 6,445,201 | B1* | 9/2002 | Simizu | G01R 1/0483 |
| | | | | 324/750.02 |
| 6,876,761 | B1* | 4/2005 | Okuda | H05K 13/0812 |
| | | | | 382/151 |
| 7,085,400 | B1* | 8/2006 | Holsing | A61B 90/36 |
| | | | | 382/103 |
| 7,996,057 | B2* | 8/2011 | Govari | A61B 8/12 |
| | | | | 600/407 |
| 9,996,931 | B2* | 6/2018 | Yamamoto | G06T 7/60 |
| 2008/0183075 | A1* | 7/2008 | Govari | A61B 8/12 |
| | | | | 600/437 |
| 2009/0096148 | A1* | 4/2009 | Usui | B25J 9/1692 |
| | | | | 269/45 |
| 2009/0190826 | A1* | 7/2009 | Tate | H04N 1/00087 |
| | | | | 382/153 |
| 2009/0278926 | A1* | 11/2009 | Kikuchi | G01R 35/005 |
| | | | | 348/135 |
| 2011/0085177 | A1* | 4/2011 | Fukumoto | G01B 11/005 |
| | | | | 356/601 |
| 2012/0277585 | A1* | 11/2012 | Koenig | A61B 8/58 |
| | | | | 600/437 |
| 2013/0021614 | A1* | 1/2013 | Hagino | G01B 11/00 |
| | | | | 356/450 |
| 2017/0103505 | A1* | 4/2017 | Demri | A61B 6/582 |
| 2018/0021955 | A1* | 1/2018 | Hatanaka | B25J 9/1692 |
| | | | | 700/254 |
| 2019/0066287 | A1* | 2/2019 | Yoshida | G01B 11/254 |

* cited by examiner

* # ROBOT SYSTEM, CALIBRATION JIG FOR ROBOT, AND CALIBRATION METHOD FOR ROBOT

The present application is based on, and claims priority from, JP Application Serial Number 2018-198377, filed Oct. 22, 2018, the disclosure of which is hereby incorporated by reference herein in its entirety.

BACKGROUND

1. Technical Field

The present disclosure relates to a technique for calibrating a robot.

2. Related Art

There has been a method of JP A-6-243236 (Patent Literature 1) as a method of determining calibration parameters for associating positions in a camera coordinate system obtained by imaging an object with a camera and positions in a spatial coordinate system of a three-dimensional space in which the object is disposed. In the technique of Patent Literature 1, processing explained below is performed in a cubic jig in order to obtain information indicating a correspondence relation of six degrees of freedom corresponding to positions and postures of the jig. That is, four labels of a figure "+" are provided on one plane among three planes adjacent to one another, four labels of a figure "−" are provided on each of the other two planes, and numbers are added to the labels. The three planes of the jig are imaged by a camera. The figures of the labels on an image are identified based on obtained image data and a direction of the jig in a three-dimensional space is calculated. With the technique of Patent Literature 1, it is possible to calculate a direction of the jig in the three-dimensional space without requiring human intervention. Therefore, it is possible to automatically associate positions on a camera coordinate and positions on a spatial coordinate of the labels on the jig. As a result, it is possible to set calibration parameters in a short time using the positions on both the coordinates.

However, in the technique of Patent Literature 1, the number of planes of the jig having directions different from one another with respect to the camera, images of the planes being obtained in one imaging, is three. Therefore, parameters for associating positions in a camera coordinate system obtained by imaging an object with the camera and positions in a spatial coordinate system of a three-dimensional space in which the object is disposed cannot be accurately decided with information obtained by the one imaging in the technique of Patent Literature 1. That is, in the technique of Patent Literature 1, it is necessary to change a posture of the jig or the camera to repeatedly perform imaging of the jig. Therefore, calibration of parameters takes time.

SUMMARY

According to an aspect of the present disclosure, there is provided a jig for calibrating parameters for associating positions specified from an image obtained by a stereo camera and positions in a three-dimensional space. The jig includes N planes attached with patterns, N being an integer equal to or larger than 4, in which $$-90° < \theta < 90° \quad (1)$$

$$\theta \neq 0 \quad (2)$$

where $\theta$ is an angle formed by, with respect to a reference normal vector perpendicular to a jig reference plane, the jig reference plane being one plane among the N planes, and having a direction from the jig reference plane toward a space in which the stereo camera is disposed, a non-reference normal vector perpendicular to a non-reference plane different from the jig reference plane among the N planes and having a direction from the non-reference plane toward the space in which the stereo camera is disposed.

A plurality of the non-reference normal vectors corresponding to (N−1) non-reference planes among the N planes have directions different from one another with respect to the reference normal vector and do not have directions symmetrical with respect to the reference normal vector.

DESCRIPTION OF EXEMPLARY EMBODIMENTS

A. First Embodiment

Figure 1:
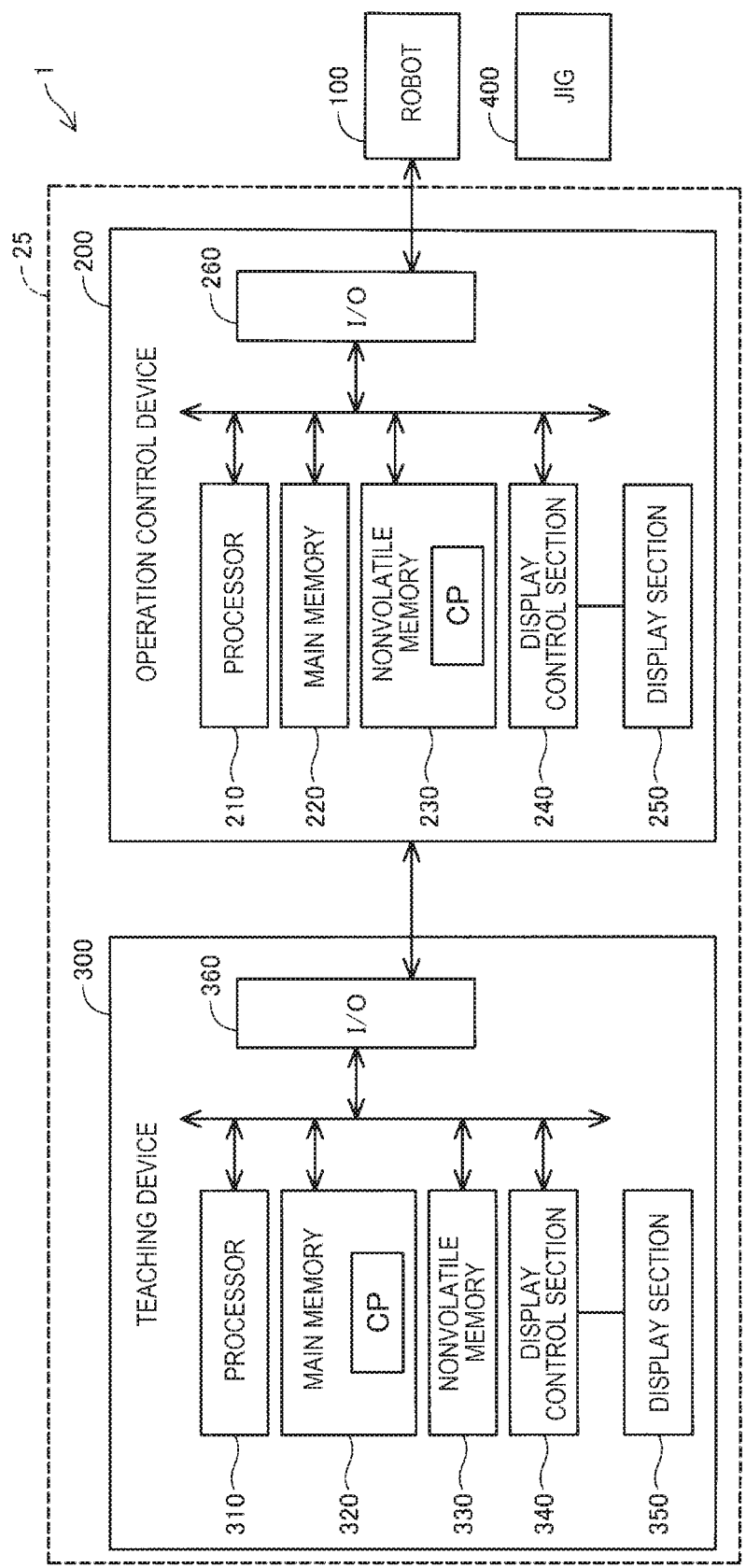
FIG. 1 is a block diagram showing a robot system in a first embodiment.

FIG. 1 is a block diagram showing a robot system 1 in a first embodiment. The robot system 1 in the first embodiment includes a robot 100, an operation control device 200, a teaching device 300, and a jig 400. The robot 100 is controlled by the operation control device 200 to operate. The operation control device 200 controls the robot 100 and causes the robot 100 to realize operation taught by the teaching device 300. In this specification, the operation control device 200 and the teaching device 300 are collectively referred to as a control section 25 as well. The jig 400 is used to calibrate parameters CP for associating positions specified from an image obtained by a stereo camera included in the robot 100 and positions in a three-dimensional space. The parameters CP are saved in the operation control device 200. The parameters CP include an external parameter and an internal parameter. The external parameter represents a relation between a coordinate system on the outside of a camera and a coordinate system of the camera. The external parameter also represents a relation between coordinate systems of two cameras configuring the stereo camera. The internal parameter represents an optical center and a focal length of a camera. The positions specified from the image obtained by the stereo camera can be converted into the positions in the three-dimensional space.

Figure 2:
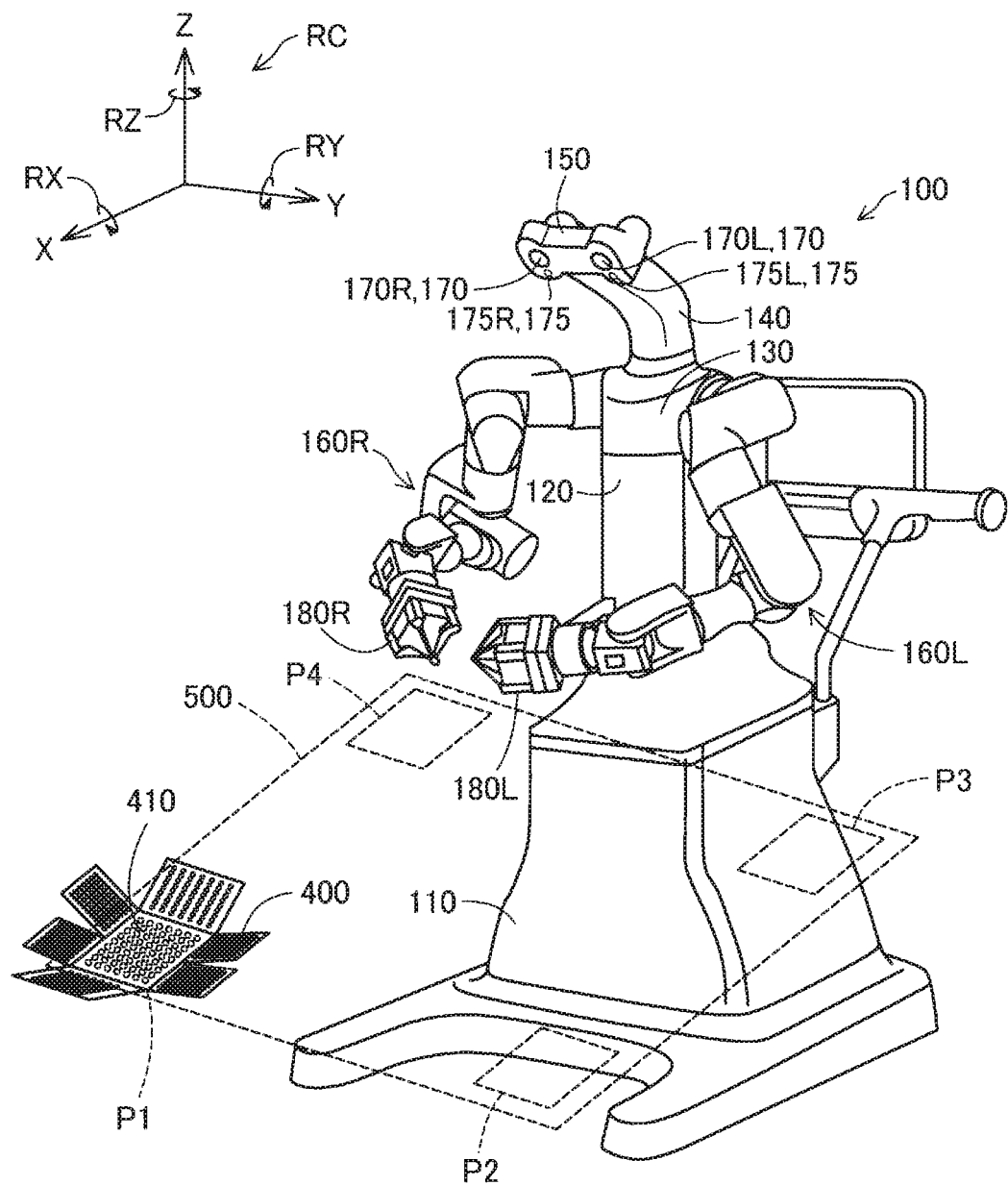
FIG. 2 is an explanatory diagram showing a robot and a jig.

FIG. 2 is an explanatory diagram showing the robot 100 and the jig 400. The robot 100 includes a base 110, a body 120, a shoulder 130, a neck 140, a head 150, and two arms 160L and 160R. The base 110 is disposed on a floor of a setting place when the robot 100 is set. The base 110 is coupled to the body 120 and supports the body 120. The body 120 is coupled to the shoulder 130 and supports the shoulder 130.

The head 150 is coupled to the shoulder 130 via the neck 140. The head 150 includes cameras 170L, 170R, 175L, and 175R. The camera 170L and 170R are disposed in symmetrical positions in the head 150 and configure a set of stereo cameras 170. The cameras 175L and 175R are disposed in symmetrical positions in the head 150 and configure a set of stereo cameras 175. Two sets of stereo cameras 170 and 175 can each image a work region of the robot 100. The stereo cameras 175 are stereo cameras for imaging a range narrower than a range imaged by the stereo cameras 170. Angles of view of the stereo cameras 175 are included in angles of view of the stereo cameras 170.

The arms 160L and 160R are coupled to the shoulder 130. The arms 160L and 160R are so-called six-axis robot arms. An end effector 180L is attached to the distal end of the arm 160L. An end effector 180R is attached to the distal end of the arm 160R. The arm 160L is controlled by the operation control device 200 to be able to dispose the end effector 180L in any position in a work space in any direction. The arm 160R is controlled by the operation control device 200 to be able to dispose the end effector 180R in any position in the work space in any direction. The end effectors 180L and 180R can perform predetermined processing on an object of work.

A workbench 500 is a table on which an object worked by the robot 100 is placed. The upper surface of the workbench 500 is parallel to an XY plane of a robot coordinate system RC. In FIG. 1, the workbench 500 is indicated by a broken line in order to facilitate understanding of a technique.

In this embodiment, a coordinate system for specifying a setting space of the robot 100 based on the position of the base 110 of the robot 100 is represented as robot coordinate system RC. The robot coordinate system RC is a three-dimensional orthogonal coordinate system defined by an X axis and a Y axis orthogonal to each other on the horizontal plane and a Z axis having a positive direction in the vertical upward direction. In this specification, when "X axis" is simply referred to, the "X axis" represents an X axis in the robot coordinate system RC. When "Y axis" is simply referred to, the "Y axis" represents a Y axis in the robot coordinate system RC. When "Z axis" is simply referred to, the "Z axis" represents a Z axis in the robot coordinate system RC. Any position in the robot coordinate system RC can be specified by a position DX in an X-axis direction, a position DY in a Y-axis direction, and a position DZ in a Z-axis direction.

In this embodiment, a rotation position around the X axis is represented by an angle position RX. A rotation position around the Y axis is represented by an angle position RY. A rotation position around the Z axis is represented by an angle position RZ. Any posture in the robot coordinate system RC can be represented by the angle position RX around the X axis, the angle position RY around the Y axis, and the angle position RZ around the Z axis. In this specification, when "position" is described, the "position" means a posture in addition to a position in a narrow sense.

The jig 400 is disposed in a plurality of places in a work space in which the robot 100 performs work, imaged by the stereo cameras 170 and 175, and used to calibrate the parameters CP. In this embodiment, the jig 400 is disposed in predetermined positions P1 to P4 on the workbench 500 and imaged by the stereo cameras 170 and 175. The positions P1 to P4 on a workbench 500 are positions included in the angles of view, that is, imaging ranges of the stereo cameras 175. Coordinates of the positions P1 to P4 on the workbench 500 are known in the robot coordinate system RC.

The angles of view of the stereo cameras 175 are included in the angles of view of the stereo cameras 170. Therefore, the positions P1 to P4 on the workbench 500 are positions present in ranges included in all the angles of view, that is, the imaging ranges of the stereo cameras 170 and 175. A shape of the angles of view of the stereo cameras 175 projected on the workbench 500 is a square. The positions P1 to P4 are located near four vertexes of a square imaging range on the workbench 500. By adopting such a form, the parameters CP can be calibrated such that a position can be accurately specified based on an image of a camera in a wider region than the imaging range.

The operation control device 200 is a computer including, as shown in FIG. 1, a processor 210, a main memory 220, a nonvolatile memory 230, a display control section 240, a display section 250, and an I/O interface 260. These sections are coupled via a bus. The processor 210 is, for example, a microprocessor or a processor circuit. The operation control device 200 is coupled to the robot 100 via the I/O interface 260. A control program for performing control of the robot 100 is installed in the operation control device 200. In the operation control device 200, these hardware resources and the control program cooperate.

The teaching device 300 is a computer including a processor 310, a main memory 320, a nonvolatile memory 330, a display control section 340, a display section 350, and an I/O interface 360. These sections are coupled via a bus. The processor 310 is, for example, a microprocessor or a processor circuit. The teaching device 300 is coupled to the operation control device 200 via the I/O interface 360. A teaching program for teaching a target position to the operation control device 200 is installed in the teaching device 300. In the teaching device 300, these hardware resources and the teaching program cooperate.

Figure 3:
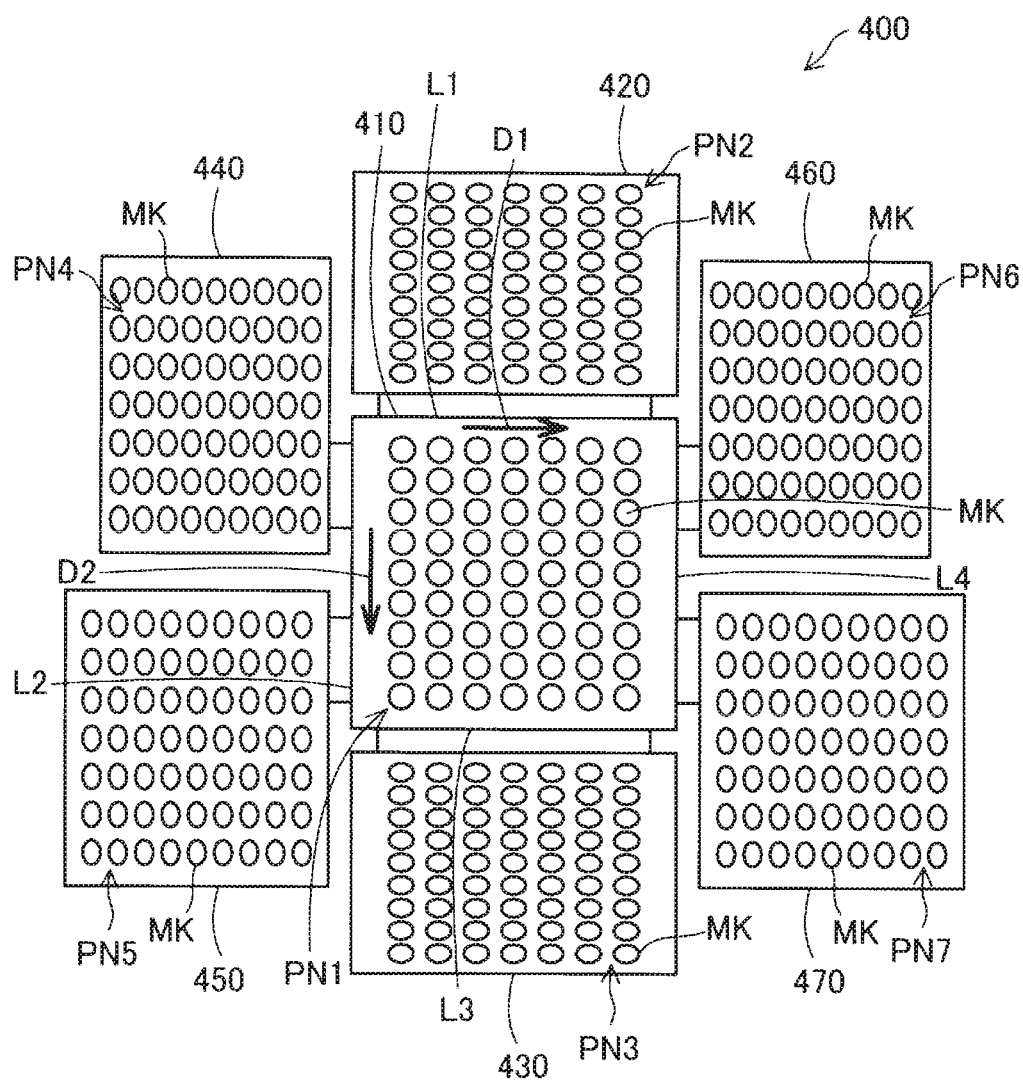
FIG. 3 is a front view showing the jig.

FIG. 3 is a front view showing the jig 400. The jig 400 includes seven planes 410 to 470 respectively attached with patterns PN1 to PN7. The plane 410 among the planes 410 to 470 is referred to as a jig reference plane 410 as well. The jig reference plane 410 is a plane arranged in parallel to the XY plane of the robot coordinate system when the jig 400 is disposed in the positions P1 to P4 on the workbench 500 and imaged by the stereo cameras 170 and 175. The processor 310 of the teaching device 300 can specify, based on a pattern of the jig reference plane 410 in images obtained by the stereo cameras 170 and 175, a position and a direction of the jig reference plane 410 in the robot coordinate system.

The jig reference plane 410 has a rectangular external shape including sides L1 and L3 extending along a first direction D1 and sides L2 and L4 extending along a second direction D2. The pattern PN1 attached to the jig reference plane 410 includes a plurality of markers MK arranged at equal intervals along the first direction D1 and the second direction D2 perpendicular to the first direction D1. The markers MK are circles colored differently from a portion other than the markers MK. The number of the markers MK arranged along the first direction D1 and the number of the markers MK arranged along the second direction D2 are different. More specifically, the number of the markers MK arranged along the first direction D1 is seven and the number of the markers MK arranged along the second direction D2 is nine. That is, the plurality of markers MK are arranged in a 9×7 matrix shape.

Since the jig reference plane 410 includes the markers MK arranged at equal intervals in an odd number×an odd number, a user can easily grasp the center of the jig reference plane 410.

The other planes 420 to 470 each have the same configuration as the configuration of the jig reference plane 410. The jig reference plane 410 is coupled to the plane 420 on the side L1. The jig reference plane 410 is coupled to the plane 430 on the side L3. The jig reference plane 410 is coupled to the planes 440 and 450 on the side L2. The jig reference plane 410 is coupled to the planes 460 and 470 on the side L4. In this specification, "a plane A is coupled to another plane B on a side X" means that the plane A having the side X and the other plane B having a side Y are coupled to each other such that the side X and the side Y are parallel to each other.

By arranging the planes 410 to 470 in this way, it is possible to reduce maximum dimensions of the external shape of the jig 400 compared with a form in which seven planes are arranged in one row and a form in which seven planes are arranged in two rows in two directions perpendicular to each other and the planes arranged in the two rows are coupled by the jig reference plane 410 located at ends of the respective rows. As a result, it is easy to handle the jig 400.

Figure 4:
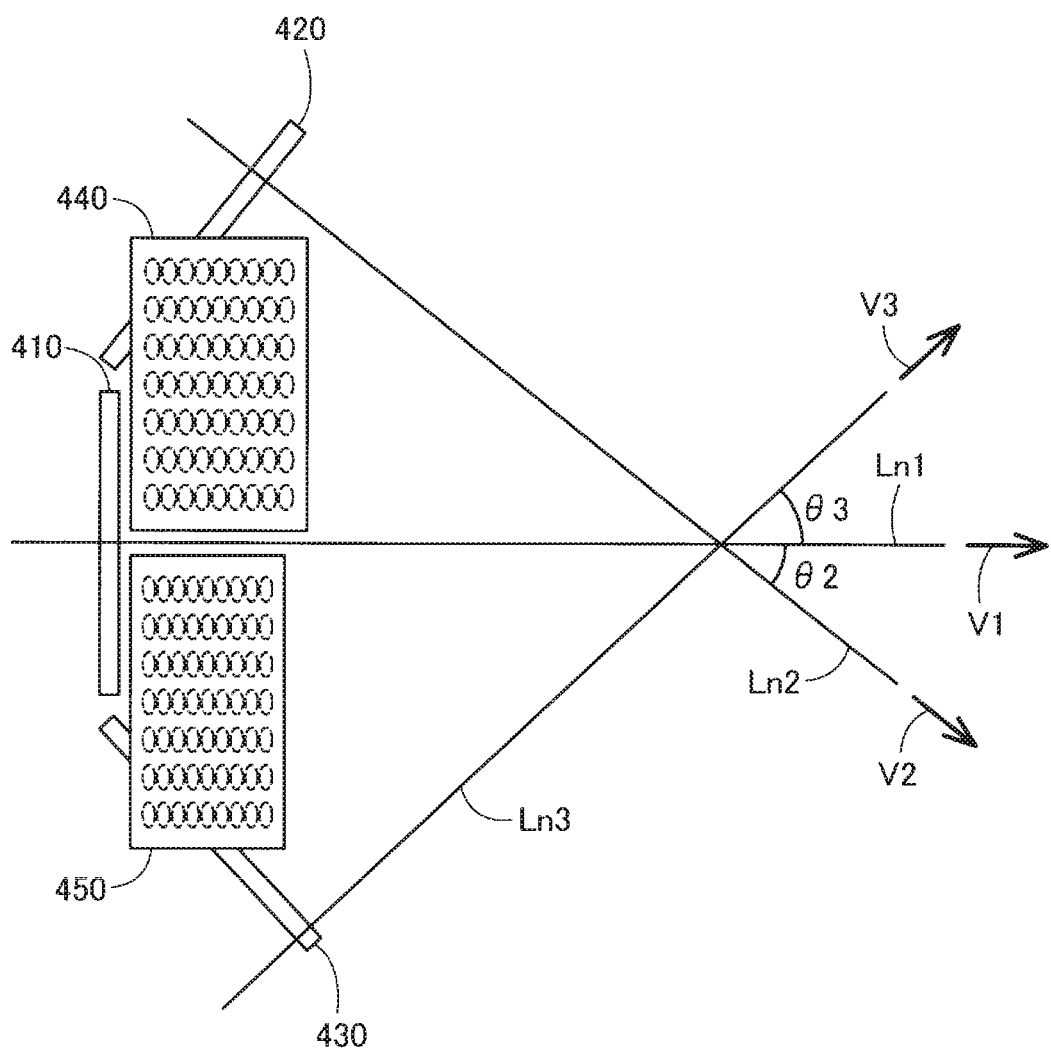
FIG. 4 is a side view of the jig viewed along a first direction from the side of planes.
Figure 5:
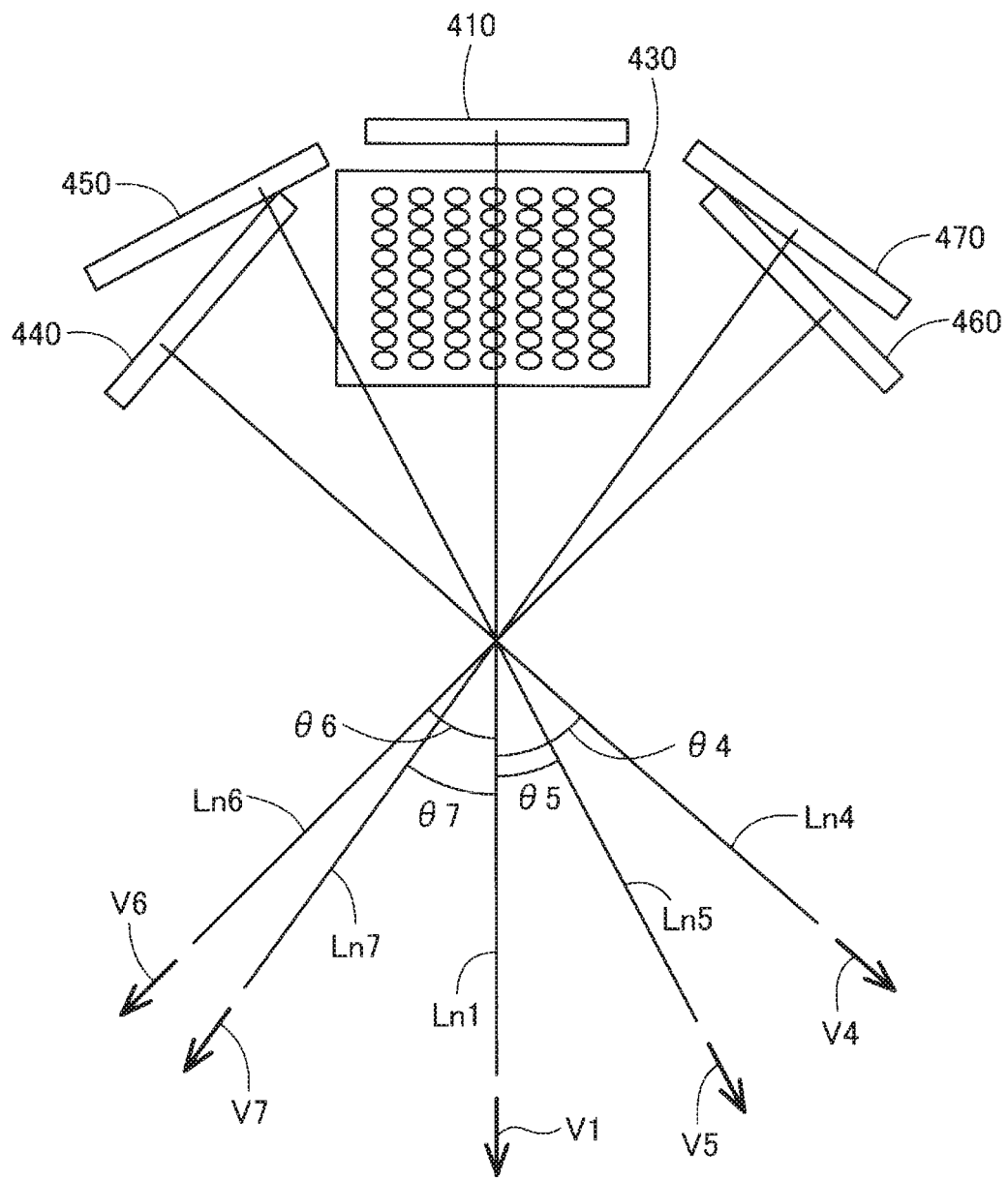
FIG. 5 is a side view of the jig viewed along a second direction from the side of a plane.

FIG. 4 is a side view of the jig 400 viewed along the first direction D1 from the side of the planes 440 and 450. FIG. 5 is a side view of the jig 400 viewed along the second direction D2 from the side of the plane 420. However, to facilitate understanding of the technique, illustration of the plane 420 is omitted in FIG. 5. To facilitate understanding of the technique, illustration of a structure for fixing the planes 420 to 470 to the jig reference plane 410 is omitted in FIGS. 4 and 5. FIGS. 4 and 5 do not show accurate dimensions of the sections.

Normal lines Ln2 to Ln7 of the planes 420 to 470 have angles θ2 to θ7 different from one another with respect to a reference normal line Ln1. The planes 420 to 470 are fixed to the jig reference plane 410 such that all of the angles θ2 to θ7 formed by the respective normal lines Ln2 to Ln7 with respect to the reference normal line Ln1, which is the normal line of the jig reference plane 410, satisfy the following Expressions (1) and (2). The normal lines Ln2 to Ln7 of the planes 420 to 470 are not symmetrical to one another with respect to the reference normal line Ln1.

$$-90° < \theta < 90° \quad (1)$$

$$\theta \neq 0 \quad (2)$$

where, θ is θ2 to θ7.

In this specification, an angle formed by a normal line B of the plane B with respect to a normal line A of the plane A indicates an angle formed by a normal vector A perpendicular to the plane A and having a direction toward a space on a side on which a pattern is attached on the plane A from the plane A and a normal vector B perpendicular to the plane B and having a direction toward a space on a side on which a pattern is attached on the plane B from the plane B. The space on the side on which the pattern is attached on the plan A from the plane A is a space on a side on which the stereo cameras 170 and 175 are disposed with respect to the plane A when a three-dimensional space including the plane A is divided by an extended plane of the plane A.

A straight line A and a straight line B being "symmetrical" with respect to a straight line C means that, when the straight line A and the straight line B are each translated until the straight line A and the straight line B cross the same point on the straight line C, the straight line A, the straight line B, and the straight line C are present in the same plane and an angle formed by the straight line A with respect to the straight line C is equal to an angle formed by the straight line B with respect to the straight line C. The straight line A and the straight line B being "not symmetrical" with respect to the straight line C means that, even if one or both of the straight line A and the straight line B are translated, the straight line A and the straight line B cannot take such a relation with respect to the straight line C.

Normal vectors V2 to V7 corresponding to the planes 420 to 470 have directions different from one another with respect to a reference normal vector V1 of the jig reference plane 410 and do not have directions symmetrical to one another with respect to the reference normal vector V1 (see FIGS. 4 and 5).

When the normal lines Ln2 to Ln7 of the planes 420 to 470 cross the normal line Ln1 of the jig reference plane 410, with respect to the jig 400, on the side on which the patterns PN2 to PN7 are attached on the planes 420 to 470 (see FIGS. 4 and 5), the angles θ2 to θ7 formed by the respective normal lines Ln2 to Ln7 with respect to the reference normal line Ln1 take positive values. When the normal lines Ln2 to Ln7 of the planes 420 to 470 cross the normal line Ln1 of the jig reference plane 410, with respect to the jig 400, on the opposite side of the side on which the patterns PN2 to PN7 are attached on the planes 420 to 470, the angles θ2 to θ7 formed by the respective normal lines Ln2 to Ln7 with respect to the reference normal line Ln1 take negative values.

Since Expression (1) is satisfied, the patterns attached to the planes 420 to 470 can be imaged from a direction right opposed to the jig reference plane 410. Therefore, all the planes 410 to 470 can be imaged in one imaging.

Since Expression (2) is satisfied, the planes 420 to 470 are not parallel to the jig reference plane 410. Therefore, in an image imaged by a camera, the planes 420 to 470 can provide kinds of information different from information provided by the jig reference plane 410. The normal lines Ln2 to Ln7 of the planes 420 to 470 are not symmetrical to one another with respect to the reference normal line Ln1. Therefore, in an image imaged by the camera, the planes 420 to 470 can provide kinds of information different from one another.

In the first embodiment, the angles θ2 to θ7 formed by the respective normal lines Ln2 to Ln7 with respect to the reference normal line Ln1 are larger than 0° and smaller than 90°. In the first embodiment, specifically, the angles θ2 to θ7 are angles of 10° to 20°.

Figure 6:
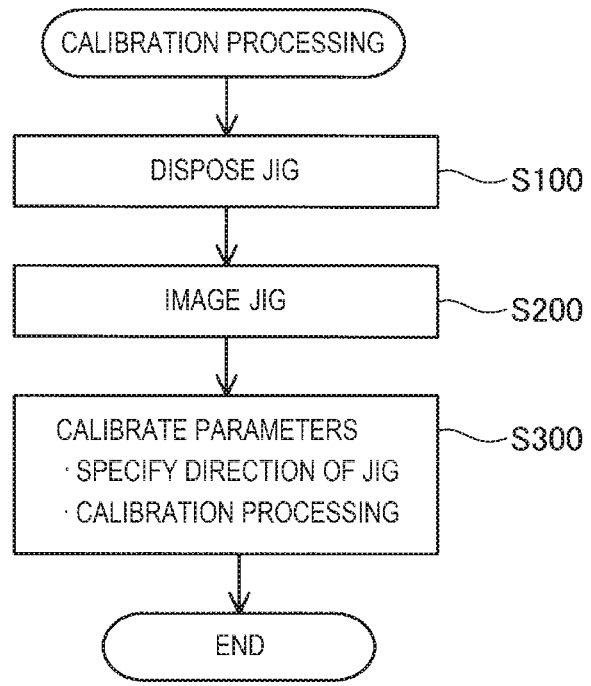
FIG. 6 is a flowchart showing processing for calibrating parameters.

FIG. 6 is a flowchart showing processing for calibrating the parameters CP. The processing shown in FIG. 6 is executed after the robot 100 and the operation control device 200 are manufactured and before the robot 100 and the operation control device 200 are shipped from a factory. The processing shown in FIG. 6 can be executed again after the robot 100 and the operation control device 200 are shipped and set in a place where the robot 100 and the operation control device 200 are operated.

In step S100, the user disposes the jig 400 in any one of the positions P1 to P4 on the workbench 500. In that case, the jig 400 is disposed, with respect to a point where a stereo camera that performs imaging in step S200 is disposed, in a direction in which the planes 410 to 470 can be imaged by the stereo cameras. The jig 400 is disposed such that the jig reference plane 410 is set in a direction parallel to the XY plane of the robot coordinate system.

Coordinates of the positions P1 to P4 on the workbench 500 are known in the robot coordinate system RC. Relative positions and relative angles of the planes 420 to 470 with respect to the jig reference plane 410 are also known. Therefore, positions and directions of the planes 410 to 470 are known in the robot coordinate system RC.

In step S200, the user images the jig 400 with the stereo camera for which calibration of the parameters CP is performed. For example, the user images the jig 400 with the stereo cameras 170. As a result of processing in step S200, the patterns PN1 to PN7 of the seven planes 410 to 470 having directions different from one another with respect to the stereo cameras 170 are imaged.

In step S300, processing for calibrating the parameters CP for associating positions specified from an image obtained by the stereo camera and positions in the three-dimensional space is performed. More specifically, first, the processor 310 of the teaching device 300 performs image recognition and specifies, based on an image of the patterns PN1 to PN7 including the markers MK obtained by the stereo camera, positions and directions of the planes 410 to 470 including the plurality of markers MK.

In the planes 410 to 470, the number of the markers MK arranged in the longitudinal direction and the number of the markers MK arranged in the lateral direction are different. Therefore, the processor 310 of the teaching device 300 can specify directions of the planes 410 to 470 based on the numbers of the markers MK arranged along two directions perpendicular to each other in the planes and not based on the shapes of the respective markers and without relying on an input from the user.

The processor 310 can specify directions of the normal lines Ln1 to Ln7 of the planes 410 to 470 based on a distortion state of intervals of the markers MK arranged along the two directions perpendicular to each other in the planes and not based on the shapes of the respective markers. The processor 310 can specify positions of the planes 410 to 470 based on the positions of images of the planes 410 to 470 in the image obtained by the stereo camera.

In step S300, calibration of the parameters CP for associating the positions of the planes 410 to 470 specified from the image obtained by the stereo camera and a position of the robot coordinate system RC in the three-dimensional space is performed. The parameters CP after the calibration are saved in the main memory 320 of the teaching device 300 and the nonvolatile memory 230 of the operation control device 200 by the processor 310 of the teaching device 300.

Since the jig 400 includes the configuration explained above, the jig 400 can be disposed with respect to points where the stereo cameras are disposed in the three-dimensional space such that the seven planes having independent angles can be imaged by the stereo cameras at a time (see S100 in FIG. 6). Therefore, it is possible to efficiently perform calibration of the parameters CP for associating positions specified from images obtained by the stereo cameras and positions in the three-dimensional space. On the other hand, in the cubic jig, since the planes that can be simultaneously imaged are the three planes, it is necessary to change the direction of the jig and perform setting a plurality of times in order to obtain information sufficient for the calibration of the parameters CP. Therefore, the calibration of the parameters CP cannot be efficiently performed.

In the above explanation, to facilitate understanding of the technique, the jig is disposed in one position among the positions P1 to P4 and steps S100 to S300 are executed. However, the processing in step S300 may be performed after the processing in steps S100 and S200 is executed in the positions P1 to P4.

In the above explanation, to facilitate understanding of the technique, steps S100 to S300 are executed using one stereo camera 170. After the parameters CP concerning the stereo camera 170 are decided in that way, the parameters CP concerning the stereo camera 175 can be decided by executing steps S100 to S300 using the stereo camera 170. The processing in steps S100 and S200 may be performed using the stereo cameras 170 and 175 and, thereafter, the processing in step S300 may be performed.

In this embodiment, the vector V1 defining the direction of the reference normal line Ln1 is referred to as "reference normal vector" as well. The other planes 420 to 470 are referred to as "non-reference planes" as well. The vectors V2 to V7 defining the directions of the normal lines Ln2 to Ln7 are referred to as "non-reference normal vectors" as well. The sides L1 and L3 are referred to as "first sides" as well. The sides L2 and L4 are referred to as "second sides" as well.

B. Second Embodiment

In the first embodiment, the planes 420 to 470 of the jig 400 are arranged in the directions in which the normal lines Ln2 to Ln7 of the planes 420 to 470 cross the normal line Ln1 of the jig reference plane 410, with respect to the jig 400, on the side on which the patterns PN1 to PN7 are attached on the planes 420 to 470 (see FIGS. 3 to 5). However, in a second embodiment, planes other than a jig reference plane included in a jig are arranged in directions different from the directions in the first embodiment with respect to the jig reference plane. The other points of a robot system in the second embodiment are the same as the points of the robot system in the first embodiment.

Figure 7:
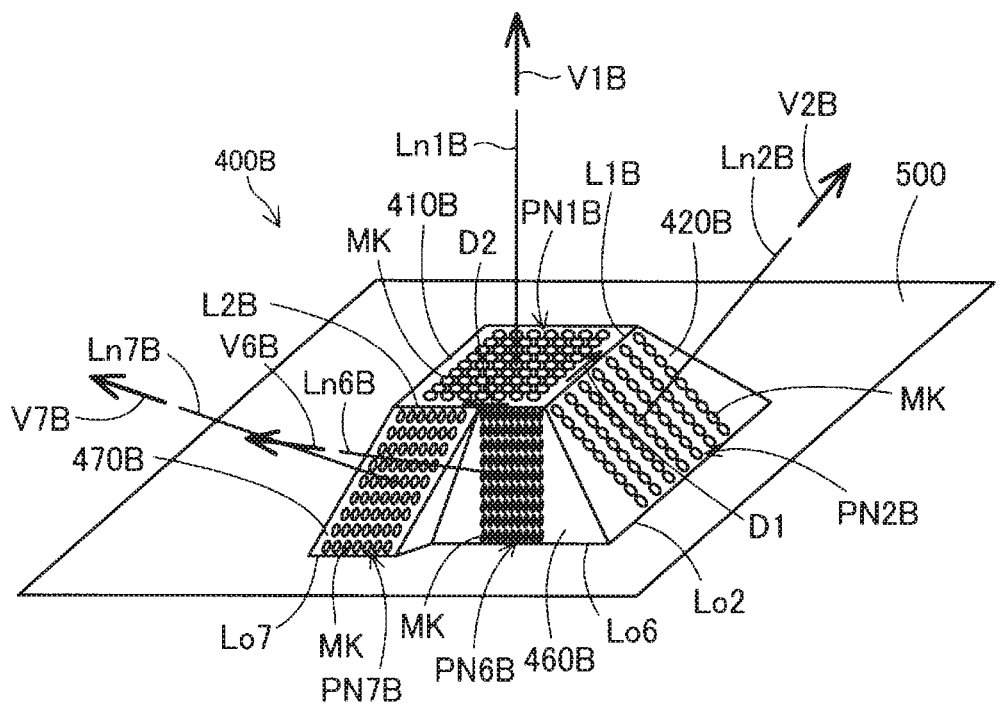
FIG. 7 is a perspective view showing a jig.

FIG. 7 is a perspective view showing a jig 400B. The jig 400B includes seven planes 410B to 470B respectively attached with patterns PN1B to PN7B. The plane 410B among the planes 410B to 470B is referred to as jig reference plane 410B as well. The configuration of the jig reference plane 410B is the same as the configuration of the jig reference plane 410 (see FIG. 2). The jig reference plane 410B is coupled to the other planes 420B to 470B on sides L1B to L4B of an external shape.

The planes 420B to 470B of the jig 400B are arranged, with respect to the jig 400B, in directions in which normal lines Ln2B to Ln7B of the planes 420B to 470B cross a reference normal line Ln1B of the jig reference plane 410B on the opposite side of a side on which the patterns PN1B to PN7B are attached on the planes 420B to 470B. As a result, in the second embodiment, angles formed by the respective normal lines Ln1B to Ln7B with respect to the reference normal line Ln1B are smaller than 0° and larger than −90°. In FIG. 7, to facilitate understanding of the technique, only the normal lines Ln1B, Ln2B, Ln6B, and Ln7B are shown. In the second embodiment, specifically, θ2 to θ7 are angles of −20° to −40°.

The other planes 420B to 470B each have trapezoidal or rectangular external shapes. The planes 420B to 470B each include pluralities of markers MK arranged along one of a first direction D1 and a second direction D2 extending along two sides of the jig reference plane 410B and a direction perpendicular to the first direction D1 or the second direction D2. On the planes 410B to 470B, the sizes of the markers MK are different. On the planes 410B to 470B, the number of the markers MK arranged along the first direction D1 and the second direction D2 and the number of the markers MK arrange along the directions perpendicular to the first direction D1 and the second direction D2 are different.

Among parallel pairs of sides of the planes 420B to 470B, sides Lo2 to Lo7 farther from the jig reference plane 410B are located in common one plane. As a result, the jig 400B can be stably disposed on the workbench 500 with sides Lo2 to Lo7 of the planes 420B to 470B faced down. In FIG. 7, to facilitate understanding of the technique, only the sides Lo2, Lo6, and Lo7 of the planes 420B, 460B, and 470B are shown.

Even in such a form, in step S100 in FIG. 6, the user can dispose, with respect to the point where the stereo camera that performs imaging in step S200 is disposed, the jig 400B in the positions P1 to P4 on the workbench 500 such that the planes 410B to 470B can be imaged by the stereo cameras at a time. As a result, it is possible to efficiently perform calibration of the parameters CP for associating positions specified from an image obtained by the stereo camera and positions in the three-dimensional space.

In this embodiment, a vector V1B defining a direction of the reference normal line Ln1B is referred to as "reference normal vector" as well. The other planes 420B to 470B are referred to as "non-reference planes" as well. Vectors V2B to V7B defining directions of the normal lines Ln2B to Ln7B are referred to as "non-reference normal vectors" as well. The sides L1B and L3B along the first direction D1 is referred to as "first sides" as well. The sides L2B and L4B along the second direction D2 are referred to as "second sides" as well.

C. Modifications of the Shape of the Markers

In the first and second embodiments, the markers MK are the circles colored differently from the portion other than the markers MK. However, the shape of markers can be other forms.

Figure 8:
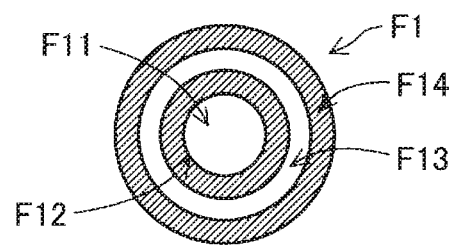
FIG. 8 is a plan view showing a marker in a modification.

FIG. 8 is a plan view showing a marker F1 in a modification. The marker F1 is configured from two large and small rings F12 and F14 that share the center. The rings F12 and F14 have the same color different from a color of a region on the outer side of the ring F14. A region F11 inside the ring F12 and a region F13 between the ring F12 and the ring F14 have the same color as the color of the region on the outer side of the ring F14.

Figure 9:
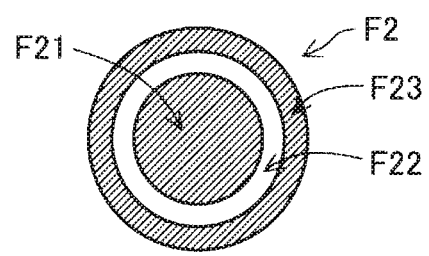
FIG. 9 is a plan view showing a marker in a modification.

FIG. 9 is a plan view showing a marker F2 in a modification. The marker F2 is configured from a circle F21 and a ring F23 that shares the center with the circle F21 and surrounds the circle F21. The circle F21 and the ring F23 have the same color different from a color of a region on the outer side of the ring F23. A region F22 between the circle F21 and the ring F23 has the same color as the color of the region on the outer side of the ring F23.

With the markers F1 and F2, it is possible to more accurately specify, through image recognition, center points of the markers compared with the markers MK in the first embodiment.

Figure 10:
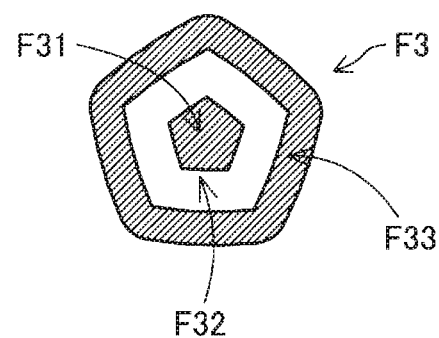
FIG. 10 is a plan view showing a marker in a modification.

FIG. 10 is a plan view showing a marker F3 in a modification. The marker F3 is configured from a regular pentagonal region F31 and a region F33 having substantially fixed width that shares the center with the region F31 and surrounds the region F31. The region F31 and the region F33 have the same color different from a color of a region on the outer side of the region F33. A region F32 between the regular pentagonal region F31 and the region F33 has the same color as the color of the region on the outer side of the region F33.

With the marker F3, it is possible to specify directions of the markers through image recognition. Therefore, even in a form in which the same number of markers are arranged longitudinally and laterally in a pattern of a plane, the processor 310 of the teaching device 300 can specify a direction of the plane.

Figure 11:
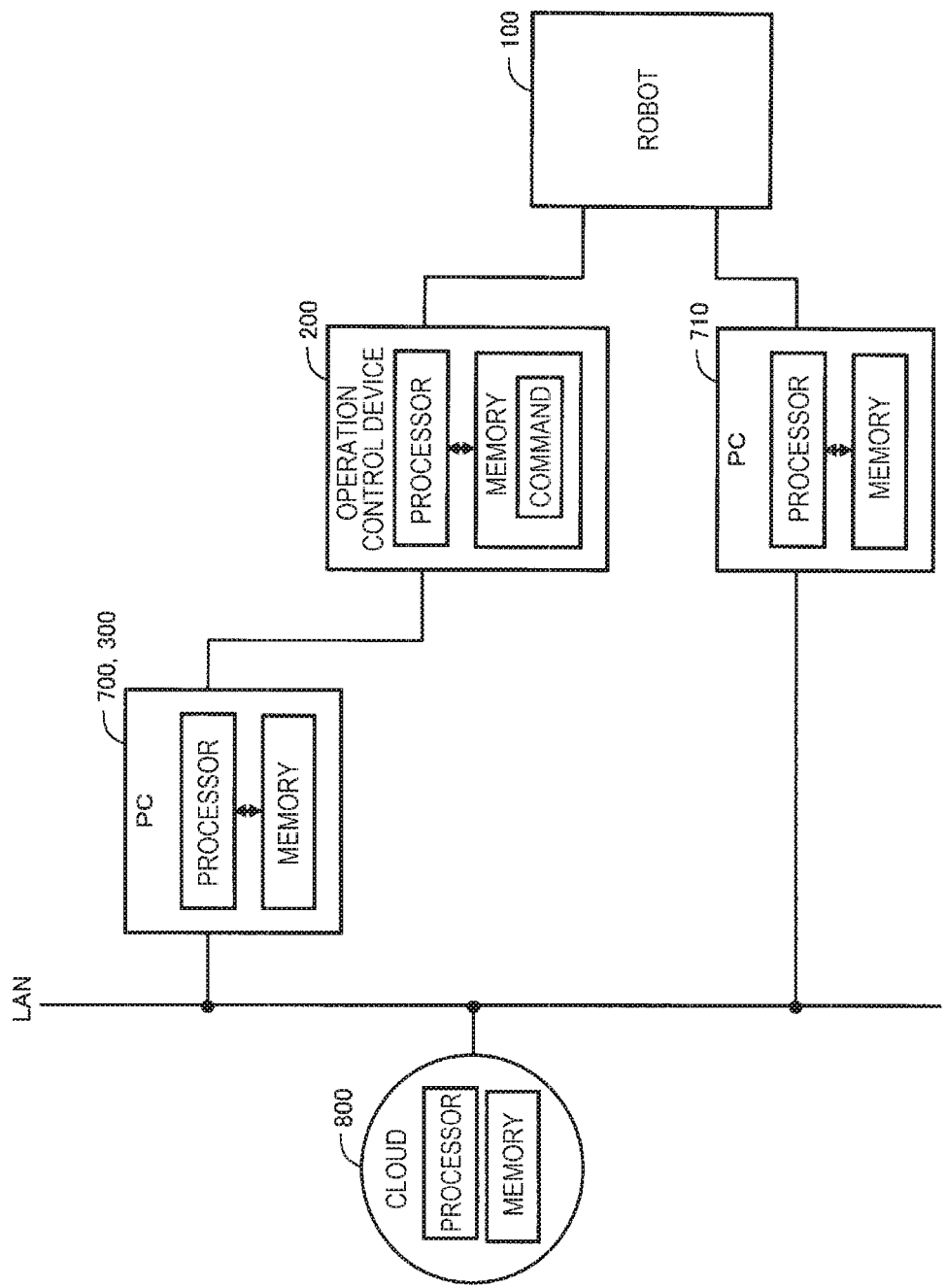
FIG. 11 is a conceptual diagram showing an example in which a control device of a robot is configured by a plurality of processors.

D. Modifications of the Robot System (1) FIG. 11 is a conceptual diagram showing an example in which a control device for a robot is configured by a plurality of processors. In this example, besides the robot 100 and the operation control device 200 for the robot 100, personal computers 700 and 710 and a cloud service 800 provided via a network environment such as a LAN are drawn. The personal computers 700 and 710 each include a processor and a memory. A processor and a memory are usable in the cloud service 800 as well. The processors execute computer-executable commands. It is possible to realize the control section 25 including the operation control device 200 and the teaching device 300 using a part or all of these plurality of processors. A storing section that stores various kinds of information can also be realized using a part or all of the plurality of memories.

Figure 12:
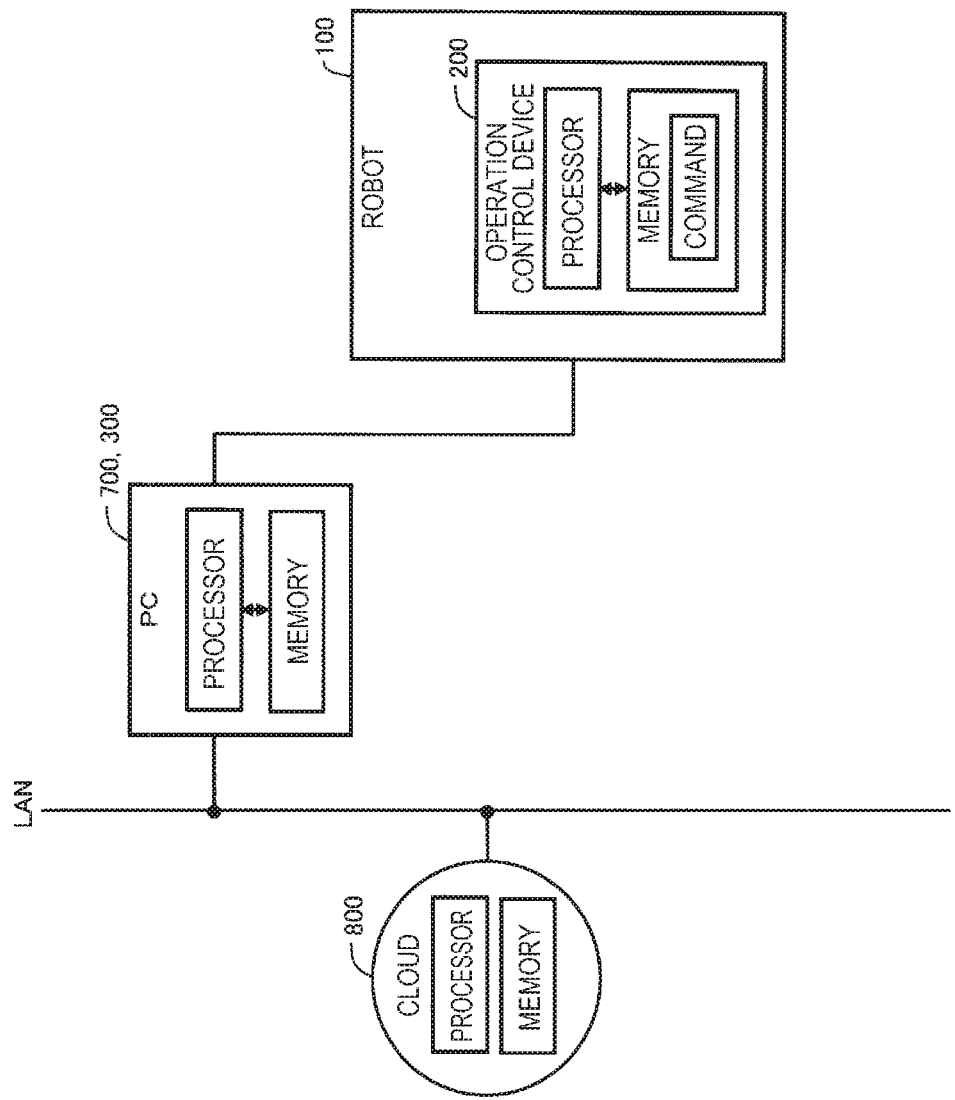
FIG. 12 is a conceptual diagram showing another example in which the control device of the robot is configured by a plurality of processors.

(2) FIG. 12 is a conceptual diagram showing another example in which a control device for a robot is configured by a plurality of processors. This example is different from the example shown in FIG. 11 in that the operation control device 200 for the robot 100 is housed in the robot 100. In this example as well, it is possible to realize the control section 25 including the operation control device 200 and the teaching device 300 using a part or all of the plurality of processors. A storing section that stores various kinds of information can also be realized using a part or all of the plurality of memories.

E. Other Forms

E1. Another Form 1

(1) In the first embodiment, the shape of the markers MK is the circle (see PN1 in FIG. 3). However, markers attached to planes of a jig may be other shapes (see FIGS. 8 to 10). The markers only have to be regions formed in a color different from a color of a region around the markers. However, the markers attached to the planes of the jig desirably have a shape, the center of gravity of which can be calculated. The markers may be arranged in the same direction or may be arranged in a plurality of different directions in the patterns attached to the planes of the jig.

(2) In the first embodiment, the plurality of markers MK are arranged at equal intervals along the first direction D1 and the second direction D2. However, an interval along the first direction D1 and an interval along the second direction D2 of the plurality of markers may be different. Intervals of a plurality of markers arranged along the same direction may be different.

(3) In the first embodiment, the patterns arranged on the planes are the same. However, the patterns arranged on the planes may include different patterns at least in a part.

(4) In the first embodiment, the jig 400 includes the seven planes 410 to 470 (see FIGS. 3 and 7). However, the number of planes included in a jig may be other numbers such as four, five, and eight. However, the number of planes included in the jig is desirably four or more, more desirably six or more, and still more desirably seven or more. With a form in which the number of planes included in the jig is six or more, it is possible to determine the parameters CP other than the internal parameter in one imaging. With the form in which the number of planes included in the jig is six or more, it is possible to determine all the parameters CP including the internal parameter in one imaging. With a form in which the number of planes included in the jig is seven or more, it is possible to further improve accuracy of parameters to be determined.

(5) In the first embodiment, the planes 420 to 470 of the jig 400 are disposed, with respect to the jig reference plane 410, in the directions in which the normal lines Ln2 to Ln7 of the planes 420 to 470 cross the normal line Ln1 of the jig reference plane 410 on the side on which the patterns PN1 to PN7 are attached on the planes 420 to 470 (see FIGS. 3 to 5). In the second embodiment, the planes 420B to 470B of the jig 400B are disposed, with respect to the jig reference plane 410B, in directions in which the normal lines Ln2B to Ln7B of the planes 420B to 470B cross the normal line Ln1B of the jig reference plane 410B on the opposite side of the side on which the patterns PN1B to PN7B are attached on the planes 420B to 470B (see FIG. 7).

However, a part of other planes arranged in different directions with respect to a jig reference plane can be arranged in directions in which normal lines of the planes cross a reference normal line of the jig reference plane at a side on which patterns are attached. Another part of the other planes can be arranged in directions in which the normal lines of the planes cross the reference normal line of the jig reference plane at the opposite side of the side on which the patterns are attached.

(6) In the first embodiment, the jig 400 is disposed in the known positions P1 to P4 on the workbench 500 and imaging of the jig 400 and the calibration processing of the parameters are performed (see FIGS. 1 to 6). However, disposition and imaging of a jig can be performed by other methods as well.

For example, it is also possible to adopt a form in which the jig 400 is held by one or both of the end effectors disposed at the distal ends of the arms 160L and 160R of the robot 100 and is disposed in one or more positions in a work space and imaging of the jig 400 and the calibration processing of the parameters are performed. In such a form as well, it is possible to specify, based on angle positions of joints of the arms 160L and 160R, a position and a direction of the jig 400 in the robot coordinate system RC. Therefore, with such a form as well, it is possible to calibrate the parameters CP for associating positions specified from images imaged and obtained by the stereo cameras 170 and 175 and positions in the three-dimensional space. By adopting such a form, it is possible to accurately calibrate parameters for associating a combination of parameters representing angle positions of joints of arms and positions specified from images obtained by stereo cameras.

(7) In the embodiments, the jig reference planes 410 and 410B are arranged in parallel to the XY plane of the robot coordinate system RC when the jigs 400 and 400B are imaged (see FIGS. 2 and 7). However, a jig reference plane may not be arranged in parallel to an XY plane of a coordinate system of a three-dimensional space. The jig reference plane can be arranged in any direction during the imaging of the jig.

(8) In the first embodiment, the jig 400 is disposed in the positions P1 to P4 and the imaging of the jig 400 and the calibration processing of the parameters are performed (see FIGS. 1 and 6). However, the number of places where a jig is disposed can be other numbers such as one, three, and the like. However, it is desirable to dispose the jig in a plurality of places in a work space, image the jig, and perform calibration of parameters. By performing such processing, it is possible to calibrate the parameters such that positions of the jig can be accurately specified based on a camera in more places in the work space.

(9) In the first embodiment, the positions P1 to P4 are located near the four vertexes of the square imaging range on the workbench 500. However, positions where a jig is disposed may be other positions. However, positions where the jig is disposed for imaging desirably include positions present near end portions of an imaging range of a stereo camera. For example, the positions where the jig is disposed for the imaging desirably include one or more sets of positions disposed on opposite sides across the center point of the imaging range of the stereo camera. By adopting such a form, it is possible to calibrate parameters such that positions of the jig can be accurately specified based on a camera. The positions where the jig is disposed for the imaging desirably include positions where work by a robot is highly likely to be performed. By adopting such a form, it is possible to calibrate the parameters such that the positions can be accurately decided in a place where the work is actually performed.

(10) In the first embodiment, the jig 400 is imaged by the stereo cameras 170 or the stereo cameras 175 (see FIGS. 2 and S200 in FIG. 6). However, a form can be adopted in which cameras are respectively included in the arms 160L and 160R of the robot 100 and a jig is imaged by one or both of the cameras in S200 in FIG. 6. In such a form as well, it is possible to specify a camera coordinate system based on angle positions of the joints of the arms 160L and 160R to which the cameras are attached. Therefore, with such a form as well, it is possible to calibrate parameters for associating positions specified from an image imaged and obtained by a camera and positions in the three-dimensional space.

In the form in which the jig is imaged by both of the cameras provided in the arms 160L and 160R of the robot 100, it is desirable to compare results based on images obtained by the respective cameras and decide parameters to minimize deviation of both the results.

(11) In the first embodiment, to facilitate understanding of the technique, the processing shown in FIG. 6 is performed once. However, a form can also be adopted in which the processing shown in FIG. 6 is performed a plurality of times to decide parameters. By performing such processing, it is possible to improve accuracy of obtained parameters.

E2. Another Form 2

(1) In the first embodiment, the number of the markers MK arranged along the first direction D1 and the number of the markers MK arranged along the second direction D2 are different on all the planes 410 to 470 included in the jig 400. However, the number of the markers MK arranged along the first direction D1 and the number of the markers MK arranged along the second direction D2 may be the same in a part of planes included in a jig.

(2) In the first embodiment, the patterns PN1 to PN7 include the pluralities of markers arranged along the first direction D1 and the second direction D2 on all the planes 410 to 470 included in the jig 400. However, a form can also be adopted in which a part of planes included in a jig does not include such markers. For example, a pattern including a radially arranged plurality of markers may be provided in a part of the planes included in the jig.

E3. Another Form 3

In the first embodiment, the jig reference plane 410 includes the plurality of markers MK and has the rectangular external shape including the side L1 along the first direction D1 and the side L2 along the second direction D2 (see FIG. 3). However, a form can also be adopted in which the jig reference plane 410 does not include the plurality of markers MK. A pattern arranged on a plane may be, for example, a form including a one continuous pattern. The jig reference plane 410 may have an external shape other than the rectangle such as a pentagon or a hexagon.

E4. Another Form 4

In the first embodiment, in the jig 400, the other planes 420 to 470 are arranged in the positions along the sides of the jig reference plane 410 having the rectangular external shape (see FIGS. 3 to 5). The same applies in the jig 400B in the second embodiment (see FIG. 7). However, planes of a jig may be arranged, for example, in a row.

E5. Another Form 5

In the first embodiment, in the jig 400, the other planes 420 to 470 are arranged in the positions along the sides of the jig reference plane 410 having the rectangular external shape (see FIGS. 3 to 5). The same applies in the jig 400B in the second embodiment (see FIG. 7). However, a form can also be adopted in which, as planes of a jig, for example, pluralities of planes respectively arranged in rows are coupled to one another at ends of the rows.

F. Still Other Forms

The present disclosure is not limited to the embodiments explained above and can be realized in various forms in a range not departing from the gist of the present disclosure. For example, the present disclosure can be realized by the following forms. The technical features in the embodiments corresponding to technical features in the forms described below can be substituted or combined as appropriate in order to solve a part or all of the problems of the present disclosure or in order to achieve a part or all of the effects of the present disclosure. Unless the technical features are explained as essential technical features in this specification, the technical features can be deleted as appropriate.

(1) According to an aspect of the present disclosure, there is provided a jig for calibrating parameters for associating positions specified from an image obtained by a stereo camera and positions in a three-dimensional space. The jig includes N planes attached with patterns, N being an integer equal to or larger than 4, in which $$-90° < \theta < 90° \quad (1)$$

$$\theta \neq 0 \quad (2)$$

where $\theta$ is an angle formed by, with respect to a reference normal vector perpendicular to a jig reference plane, the jig reference plane being one plane among the N planes, and having a direction from the jig reference plane toward a space in which the stereo camera is disposed, a non-reference normal vector perpendicular to a non-reference plane different from the jig reference plane among the N planes and having a direction from the non-reference plane toward the space in which the stereo camera is disposed. A plurality of the non-reference normal vectors corresponding to (N−1) non-reference planes among the N planes have directions different from one another with respect to the reference normal vector and do not have directions symmetrical with respect to the reference normal vector.

By adopting such a form, it is possible to dispose, with respect to a point where the stereo camera is disposed, the jig in the three-dimensional space such that four or more planes having independent angles can be imaged by the stereo camera. Therefore, it is possible to efficiently perform, compared with the cubic jig, the calibration of the parameters for associating the positions specified from the image obtained by the stereo camera and the positions in the three-dimensional space.

(2) In the jig according to the aspect, a form can also be adopted in which, in one or more planes among the N planes, the pattern includes a plurality of markers of a matrix shape arranged along a first direction and a second direction perpendicular to the first direction, and a number of the markers arranged along the first direction and a number of the markers arranged along the second direction are different.

By adopting such a form, by performing image recognition based on an image obtained by imaging the jig, it is possible to specify, not based on a shape of the markers, a direction of a plane including the plurality of markers. Accordingly, it is possible to efficiently perform the calibration.

(3) In the jig according to the aspect, a form can also be adopted in which the jig reference plane includes the plurality of markers and has a rectangular external shape including a first side along the first direction and a second side along the second direction.

By adopting such a form, when the jig is disposed in the three-dimensional space, a user can easily align one of the first direction and the second direction with a desired direction and align the other of the first direction and the second direction with a direction perpendicular to the desired direction. Accordingly, it is possible to efficiently perform the calibration.

(4) In the jig according to the aspect, a form can also be adopted in which the jig reference plane is coupled to one or more of the non-reference planes at the first side and, at the second side, coupled to one or more of the non-reference planes not coupled to the first side.

By adopting such a form, it is possible to reduce maximum dimensions of the external shape of the jig and it is easy to handle the jig compared with a form in which the N planes are arranged in a row.

In the jig according to the aspect, a form can also be adopted in which the jig reference plane is coupled to one or more planes among the other planes at two sides along the first direction and coupled to other one or more planes among the other planes at two sides along the second direction.

By adopting such a form, it is possible to reduce distances from the jig reference plane to the planes included in the other planes compared with a form in which the N planes are arranged in two rows in two directions perpendicular to each other and the planes arranged in the two rows are coupled on the jig reference plane located at ends of the respective rows. Therefore, it is possible to more accurately perform the calibration.

(5) According to another aspect of the present disclosure, a robot system is provided. The robot system includes: an arm configured to handle an object; a stereo camera configured to image the object; a control section configured to control the arm based on an image obtained by the stereo camera; and a jig for calibrating parameters for associating positions specified from the image obtained by the stereo camera and positions in a three-dimensional space. The jig includes N planes attached with patterns, N being an integer equal to or larger than 4, in which $$-90° < \theta < 90° \quad (1)$$

$$\theta \neq 0 \quad (2)$$

where θ is an angle formed by, with respect to a reference normal vector perpendicular to a jig reference plane, the jig reference plane being one plane among the N planes, and having a direction from the jig reference plane toward a space in which the stereo camera is disposed, a non-reference normal vector perpendicular to a non-reference plane different from the jig reference plane among the N planes and having a direction from the non-reference plane toward the space in which the stereo camera is disposed. A plurality of the non-reference normal vectors corresponding to (N−1) non-reference planes among the N planes have directions different from one another with respect to the reference normal vector and do not have directions symmetrical with respect to the reference normal vector.

(6) In the robot system according to the aspect, a form can also be adopted in which, in one or more planes among the N planes, the pattern includes a plurality of markers of a matrix shape arranged along a first direction and a second direction perpendicular to the first direction, and a number of the markers arranged along the first direction and a number of the markers arranged along the second direction are different.

(7) According to another aspect of the present disclosure, there is provided a method for calibrating parameters for associating positions specified from an image obtained by a stereo camera and positions in a three-dimensional space. The method includes: (a) disposing a jig in a predetermined position, the jig including N planes attached with patterns, N being an integer equal to or larger than 4, in which $$-90° < \theta < 90° \quad (1)$$

$$\theta \neq 0 \quad (2)$$

where θ is angle formed by, with respect to a reference normal vector perpendicular to a jig reference plane, the jig reference plane being one plane among the N planes, and having a direction from the jig reference plane toward a space in which the stereo camera is disposed, a non-reference normal vector perpendicular to a non-reference plane different from the jig reference plane among the N planes and having a direction from the non-reference plane toward the space in which the stereo camera is disposed, and a plurality of the non-reference normal vectors corresponding to (N−1) non-reference planes among the N planes having directions different from one another with respect to the reference normal vector and not having directions symmetrical with respect to the reference normal vector; (b) imaging the jig with the stereo camera; and (c) determining, based on an image of patterns on the planes obtained by the stereo camera and the predetermined position, parameters for associating positions specified from the image obtained by the stereo camera and positions obtained based on the predetermined position and saving the parameters.

(8) In the calibration method according to the aspect, a form can also be adopted in which, in one or more planes among the N planes, the pattern includes a plurality of markers of a matrix shape arranged along a first direction and a second direction perpendicular to the first direction, a number of the markers arranged along the first direction and a number of the markers arranged along the second direction are different, and (c) includes specifying, based on an image of the pattern including the markers obtained by the stereo camera, a direction of the plane including the plurality of markers.

By adopting such a form, it is possible to specify, not based on a shape of the markers, a direction of a plane including the plurality of markers. Accordingly, it is possible to efficiently perform the calibration.

The present disclosure can also be realized in various forms other than the robot system, the calibration jig for the robot, and the calibration method for the robot. For example, the present disclosure can be realized in forms such as a manufacturing method for a jig, a computer program for realizing the calibration method for the robot, and a non-transitory recording medium recording the computer program.

Not all of a plurality of constituent elements of the aspects of the present disclosure explained above are essential. A part of the plurality of constituent elements can be changed, deleted, or substituted with other new constituent elements or limiting content of the plurality of constituent elements can be deleted as appropriate in order to solve a part or all of the problems described above or achieve a part or all of the effects described in this specification. A part or all of the technical features included in an aspect of the present disclosure can be combined with a part or all of the technical features included in the other aspects of the present disclosure to form an independent aspect of the present disclosure.

What is claimed is:

1. A jig for calibrating parameters for associating positions specified from an image obtained by a stereo camera and positions in a three-dimensional space, the jig including N planes attached with patterns, N being an integer equal to or larger than 4, wherein $$-90° < \theta < 90° \quad (1)$$

$$\theta \neq 0 \quad (2)$$

where θ is an angle formed by, with respect to a reference normal vector perpendicular to a jig reference plane, the jig reference plane being one plane among the N planes, and having a direction from the jig reference plane toward a space in which the stereo camera is disposed, a non-reference normal vector perpendicular to a non-reference plane different from the jig reference plane among the N planes and having a direction from the non-reference plane toward the space in which the stereo camera is disposed, and
    a plurality of the non-reference normal vectors corresponding to a plurality of (N−1) non-reference planes among the N planes have directions different from one another with respect to the reference normal vector and do not have directions symmetrical with respect to the reference normal vector.

2. The jig according to claim 1, wherein
    in one or more planes among the N planes, the pattern includes a plurality of markers of a matrix shape arranged along a first direction and a second direction perpendicular to the first direction, and
    a number of the markers arranged along the first direction and a number of the markers arranged along the second direction are different.

3. The jig according to claim 2, wherein the jig reference plane includes the plurality of markers and has a rectangular external shape including a first side along the first direction and a second side along the second direction.

4. The jig according to claim 3, wherein the jig reference plane is coupled to one or more of the non-reference planes at the first side and, a the second side, coupled to one or more of the non-reference planes not coupled to the first side.

5. A robot system comprising:
    an arm configured to handle an object;

a stereo camera configured to image the object;

a control section configured to control the arm based on an image obtained by the stereo camera; and a jig for calibrating parameters for associating positions specified from the image obtained by the stereo camera and positions in a three-dimensional space, the jig including N planes attached with patterns, N being an integer equal to or larger than 4, wherein $$-90° < \theta < 90° \quad (1)$$

$$\theta \neq 0 \quad (2)$$

where $\theta$ is an angle formed by, with respect to a reference normal vector perpendicular to a jig reference plane, the jig reference plane being one plane among the N planes, and having a direction from the jig reference plane toward a space in which the stereo camera is disposed, a non-reference normal vector perpendicular to a non-reference plane different from the jig reference plane among the N planes and having a direction from the non-reference plane toward the space in which the stereo camera is disposed, and a plurality of the non-reference normal vectors corresponding to (N−1) non-reference planes among the N planes have directions different from one another with respect to the reference normal vector and do not have directions symmetrical with respect to the reference normal vector.

6. The robot system according to claim 5, wherein in one or more planes among the N planes, the pattern includes a plurality of markers of a matrix shape arranged along a first direction and a second direction perpendicular to the first direction, and a number of the markers arranged along the first direction and a number of the markers arranged along the second direction are different.

7. A method for calibrating parameters for associating positions specified from an image obtained by a stereo camera and positions in a three-dimensional space, the method comprising:

(a) disposing a jig in a predetermined position, the jig including N planes attached with patterns, N being an integer equal to or larger than 4, in which $$-90° < \theta < 90° \quad (1)$$

$$\theta \neq 0 \quad (2)$$

where $\theta$ is an angle formed by, with respect to a reference normal vector perpendicular to a jig reference plane, the jig reference plane being one plane among the N planes, and having a direction from the jig reference plane toward a space in which the stereo camera is disposed, a non-reference normal vector perpendicular to a non-reference plane different from the jig reference plane among the N planes and having a direction from the non-reference plane toward the space in which the stereo camera is disposed, and a plurality of the non-reference normal vectors corresponding to (N−1) non-reference planes among the N planes having directions different from one another with respect to the reference normal vector and not having directions symmetrical with respect to the reference normal vector;

(b) imaging the jig with the stereo camera; and (c) determining, based on an image of patterns on the planes obtained by the stereo camera and the predetermined position, parameters for associating positions specified from the image obtained by the stereo camera and positions obtained based on the predetermined position and saving the parameters.

8. The calibration method according to claim 7, wherein in one or more planes among the N planes, the pattern includes a plurality of markers of a matrix shape arranged along a first direction and a second direction perpendicular to the first direction, a number of the markers arranged along the first direction and a number of the markers arranged along the second direction are different, and the (c) includes specifying, based on an image of the pattern including the markers obtained by the stereo camera, a direction of the plane including the plurality of markers.

\* \* \* \* \*